SOLDER WELL TERMINAL

Original Filed Sept. 8, 1958 2 Sheets-Sheet 1

INVENTORS
PAUL A. MAXIMOFF
BILLY ERIK OLSSON
BY Byron, Hume, Groen & Clement
ATTYS.

Nov. 10, 1964 P. A. MAXIMOFF ETAL 3,156,517

SOLDER WELL TERMINAL

Original Filed Sept. 8, 1958 2 Sheets-Sheet 2

INVENTORS
PAUL A. MAXIMOFF
BILLY ERIK OLSSON

BY Byron, Hume, Groen & Clement

ATTYS.

United States Patent Office 3,156,517
Patented Nov. 10, 1964

3,156,517

SOLDER WELL TERMINAL

Paul A. Maximoff, Barrington, and Billy Erik Olsson, Chicago, Ill., assignors to Malco Manufacturing Company, Chicago, Ill., a partnership Continuation of application Ser. No. 759,721, Sept. 8, 1958. This application Feb. 12, 1962, Ser. No. 174,653
11 Claims. (Cl. 339—220)

This invention relates to electrical terminal connectors for insertion in terminal base boards utilized in the electrical and electronics industries. More particularly, the invention relates to solder well terminals for securing one or more electrical leads to a terminal base board. The terminals of this invention are specially adapted for efficient, high-speed insertion by means of automatic machines.

The present application is a continuation of applicants' prior co-pending application, Serial No. 759,721, filed Setember 8, 1958, and now abandoned.

The particular terminal connector herein disclosed is particularly suited to electronic or electrical assemblies utilizing terminal base boards adapted for receiving a plurality of such terminals. The terminals are primarily intended for securing in insulating base boards which, in some instances, may constitute printed circuit boards having certain electrical conductive paths provided by conducting material attached to the insulating boards in patterns suited to the particular purposes of the circuits. In certain instances the boards may be formed of electrical conducting material providing electrical connection between all of the terminals secured to the boards. In each case separate leads are ultimately connected to the terminals to provide the desired pattern of electrical connections, and ordinarily the terminals with connected leads are dipped in molten solder to make the connections permanent.

For solder well terminals it is important that the leads inserted in the terminals be firmly held therein before soldering in spite of rough handling. It is also important that sufficient openings be provided for free flow of solder into and out of the well portion of the terminal during the soldering operation.

One of the necessary requirements of a terminal connector herein disclosed is that it be readily adaptable to automation for dispensing the connector and for mounting it in the terminal base board. Thus, it is important that the terminal be capable of ready insertion, that it allow for easy insertion of electrical leads, and that the leads be efficiently inserted without regard to endwise location. In other words, such terminals must be constructed and arranged so that all operations involved in securing the terminals to the board and in securing the leads to the terminals are substantially foolproof.

Accordingly, it is an object of the present invention to provide an improved terminal conductor for use in terminal base boards and the like.

Another object of the invention is to provide an improved solder well terminal connector embodying improved means for holding electrical leads before and during the soldering operation.

A further object of the invention is to provide an improved solder well terminal embodying electrical lead holding means adaptable for holding a wide variety of sizes and numbers of leads.

Still another object of the invention is to provide an improved solder well terminal connector embodying means for insuring free flow of solder into and out of the terminal during the soldering operation.

An additional object of the invention is to provide an improved solder well terminal connector which is particularly adapted for insertion by high speed automatic machinery.

A still further object of the invention is to provide a solder well terminal connector which can be readily adapted for use with terminal base boards of substantially varying thickness.

Another object of the invention is to provide a terminal connector which is readily and inexpensively manufactured.

An important object of the invention is to provide an improved terminal connector for receiving a plurality of leads which eliminates any need for cutting off lead ends and also eliminates any need for careful placement of leads.

Other objects, features and advantages will be apparent from the following detailed description taken in conjunction with the accompanying drawings, in which.

Figure 1:
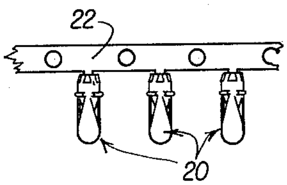
FIGURE 1 is a plan view of a plurality of metallic solder well terminal connectors of one embodiment of the present invention, showing the terminal connectors secured in chain form for dispensing in automatic machinery.

In FIGURE 1 the solder well terminal connectors according to the present invention are generally designated by the reference numeral 20. The terminal connectors are secured in chain form for efficient dispensing in automatic machinery such as that described in Maximoff Patent No. 2,814,802, dated December 3, 1957, and Maximoff et al. patent application Serial No. 664,240, filed June 7, 1957, both owned by the assignee of the present invention. The chain comprises the terminals 20 integrally secured in equally spaced relation along one edge of a flexible metallic feed strip 22. It is contemplated that the terminals will be fed, severed from the flexible strip, dispensed in a preselected pattern, and permanently secured in a terminal base board, such as the insulating base board 24 of FIGURE 2, all automatically.

Figure 2:
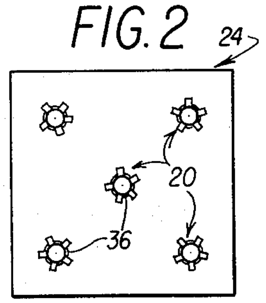
FIGURE 2 is a plan view of an electrical terminal base board, showing a plurality of terminal connectors of FIGURE 1 permanently secured in the board in position for receiving electrical leads.

The terminal base board 24 of FIGURE 2 may be formed of fairly rigid insulating material, and, if desired, may carry a "printed" circuit pattern of electrical conducting material (not shown) on one or both surfaces thereof. In certain instances the terminal base board may be formed of an electrical conducting material so that all connectors secured thereto will be electrically connected.

Figure 6:
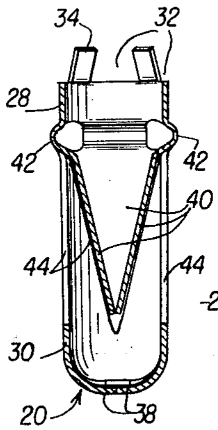
FIGURE 6 is a longitudinal sectional view taken along line 6—6 of FIGURE 4.
Figure 7:
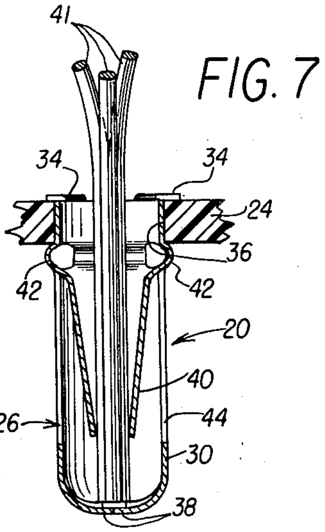
FIGURE 7 is an enlarged longitudinal sectional view like FIGURE 6 but showing the terminal connector secured in a terminal base board with a plurality of wiring leads inserted therein before soldering.
Figure 5:
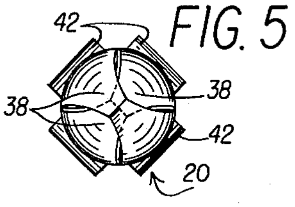
FIGURE 5 is a bottom end view of the terminal connector of FIGURE 3.
Figure 8:
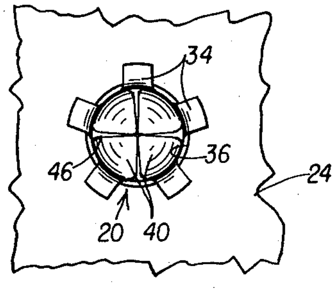
FIGURE 8 is a top view of the terminal connector of FIGURE 7 but showing the terminal connector with the wiring leads removed for clarity.

Referring now to FIGURES 3–8, the terminal connector 20 comprises a generally cylindrical sheet metal body 26 which includes an upper fastening portion 28 and a lower solder well portion 30. The fastening portion 28 is provided with a plurality of endwise notches or slots 32 forming a plurality of fastening or staking tabs 34 therebetween. The fastening portion 28 is intended to be inserted in any one of a plurality of circular apertures 36 of the terminal base board 24, and the terminal connector is permanently secured therein by bending over the tabs 34 as shown in FIGURES 7 and 8. The inserting and staking operations are intended to be performed automatically in automatic machines such as those previously referred to, and in order to enhance foolproof automatic insertion, the end of the fastening portion may be tapered slightly by bending the fastening tabs 34 inwardly as shown.

The solder well portion 30 of the terminal connector 20 is integrally formed with the fastening portion 28, and the bottom end is closed by means of four closing tabs 38. The tabs 38 are formed at the end of the solder well portion and are bent over toward one another in opposite pairs, so that the ends of the respective pairs abut or substantially abut (FIGS. 5 and 6), with one pair of closing tabs underlying and abutting the other pair.

Four holding or gripping fingers 40 are integrally formed in the well portion 30 for gripping one or more electrical leads of various types and sizes, such as wires, tube prongs, resistor leads, or other component leads. In FIGURE 7, wiring leads 41 are inserted into the connector. The ends of the leads inserted into the terminal connector are stripped of insulation, as shown, in order to provide electrical connection with the terminal connector and with all of the leads inserted therein. The gripping fingers 40 are formed as elongated isosceles triangles with the sides severed from the material of the well portion 30 and with the base portions integrally connected to the terminal connector at the juncture between the fastening portion 28 and the well portion 30. The gripping fingers extend downwardly into the well portion 30 in converging cantilever relation toward the closed end of the well with the free ends normally engaging or substantially engaging one another.

In order to permit free flexing of the gripping fingers 40 and to insure that the fingers are resiliently urged toward one another, spring curls 42 are formed at the junctures of the respective gripping fingers with the terminal connector body. These springs curls 42 also serve to shorten the gripping fingers 40, as best seen in FIGURE 6, so that they may be freely flexed without interference with the edges of the corresponding triangular cut-outs 44. Inasmuch as the springs 42 are curled outwardly as shown, they collectively provide an intermittent annular bead which engages the bottom surface of the terminal base board 24 to act as a stop when the terminal connector 20 is inserted in a board aperture 36. Thus, when the fastening tabs 34 are bent over as shown in FIGURE 7 with the bead engaging the lower surface of the terminal base board, the terminal is permanently and rigidly secured to the base board.

Figure 4:
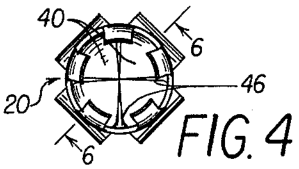
FIGURE 4 is a top end view of the terminal connector of FIGURE 3.
Figure 3:
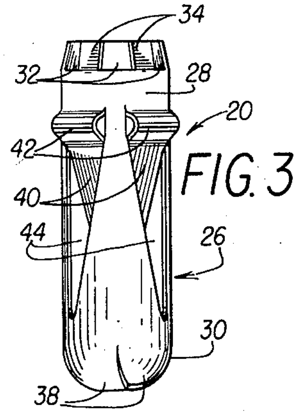
FIGURE 3 is an enlarged longitudinal elevational view of one of the terminal connectors of FIGURE 1 showing the terminal connector before it is inserted in a terminal base board.

It will be noted from FIGURES 6 and 7 that the lower portions of the spring curls 42 are formed radially inwardly a substantial distance so that the spaces 46 between adjacent gripping fingers are very narrow, as seen in FIGURES 4 and 8. This prevents small leads from inadvertently slipping between adjacent fingers, which would preclude their being gripped.

Because of the manner of formation of the fastening tabs 34 the terminal connectors 20 may be secured in boards of varying thickness. The board may vary between a thickness slightly less than the distance between the upper edges of the spring curls 42 and the lower edges of the notches 32, to a thickness extending a substantial distance above the lower edges of the notches 32. If desired, the fastening tabs may be made somewhat longer to accommodate wider variations in board thickness.

By reason of the configuration of the gripping fingers 40 and the resilient interaction with the spring curls 42, the connector is adapted for holding electrical leads of substantially varying size, varying in number from one to six or more, depending upon the lead size. The leads may be readily inserted into the terminal connector and once inserted will be firmly held therein. It will be understood that leads of various sizes may be inserted and gripped in a single connector.

Inasmuch as the well portion 30 is closed at the bottom end to provide a lead stop, the leads may be inserted without regard to placement until they engage the bottom, thereby insuring uniformity of location. It is important to note that the inserted leads do not present any protruding ends which would have to be cut off by clipping or sanding. This feature eliminates the additional cut-off operation of prior connectors of the general type.

When the leads have been inserted, as shown in FIGURE 7, they are firmly held in the terminal connector and will not come out even though the terminal base board 24 may be subjected to rough handling during subsequent operations. It is contemplated that the leads will be permanently soldered in the connector 20 in a subsequent operation, but in certain applications the connection provided by the gripping fingers is sufficient without soldering.

In the ordinary case the terminal base boards 28 with terminal connectors 20 secured thereto are solder dipped. In this operation the terminal connectors with inserted leads 41 have their solder well portions 30 dipped into a bath of molten solder (not shown), and the molten solder freely flows into the wells through the triangular cut-outs 44. Thus, the cut-outs and the gripping fingers severed therefrom both serve useful purposes. When the connectors are withdrawn from the solder bath, sufficient solder adheres to the adjacent portions of the leads and the gripping fingers to provide a permanent bond between the leads and the terminal connectors.

Figure 9:
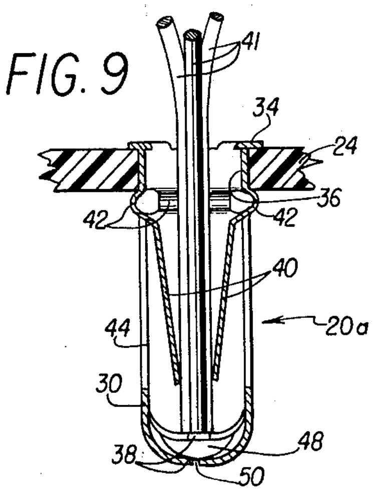
FIGURE 9 is an enlarged longitudinal sectional view similar to FIGURE 7 but showing another embodiment of the invention.

In FIGURE 9 another embodiment is shown which is the same as the previous embodiment except that the bottom end of the solder well portion is modified to enhance the flow of solder into and out of the solder well during the soldering operation. In this embodiment the modified terminal connector is designated by the reference numeral *20a*. The terminal connector *20a* includes closing tabs 38 which are bent over so that the inner pair of tabs is spaced upwardly somewhat from the outer pair of tabs, thus providing a space 48 between the respective pairs of tabs which is connected with the interior of the well. In addition, a gap 50 is formed between the inner ends of the lower pair of tabs 38 to enhance solder flow into and out of the space 48. As in the previous embodiment, the closing tabs 38 still act as a stop for the lower ends of the wiring leads 41. The space 48 and the gap 50 form a restricted solder flow passage which is sized so that the solder will flow freely into and out of the solder well during the soldering operation. This is particularly advantageous when the terminal connector is removed from the solder bath since most of the solder flows out leaving only enough adhering to the leads and gripping fingers to provide a permanent connection. This results in use of a minimum amount of solder to reduce the cost. In all other respects the terminal connector 20*a* of FIGURE 9 is the same as the solder well connector 20 of the previous embodiment.

Figure 10:
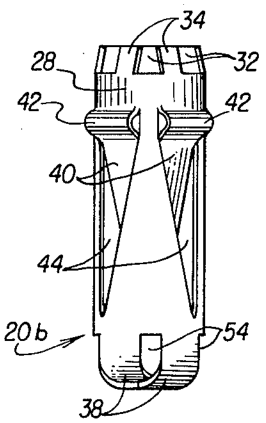
FIGURE 10 is an enlarged longitudinal elevational view similar to FIGURE 3 but illustrating a third embodiment of the invention.

In FIGURE 10 another embodiment is illustrated which is modified in a different manner to enhance flow of solder into and out of the solder well during the soldering operation. The modified terminal connector of this embodiment is designated by the reference numeral 20*b* and it is in all respects similar to the embodiment of FIGURES 1–8 except that spaces are provided between the closing tabs 38 to form four openings 54 when the tabs are closed. These four openings 54 allow free flow of solder into the solder well portion 30 during the solder dip operation, and they allow most of the solder to flow out when the terminal is removed from the solder bath in order to conserve solder. The bottom end of the solder well portion is still closed to provide a lead stop as is the case with the two earlier embodiments.

Figure 11:
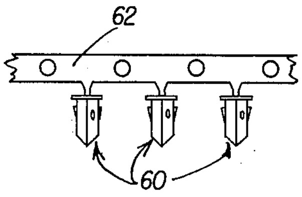
FIGURE 11 is a plan view of a plurality of metallic terminal connectors of a fourth embodiment of the invention, showing the terminal connectors secured in chain form for dispensing an automatic machinery.
Figure 13:
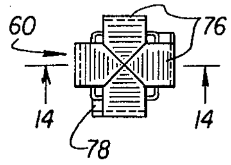
FIGURE 13 is a top end view of the terminal connector of FIGURE 12.
Figure 12:
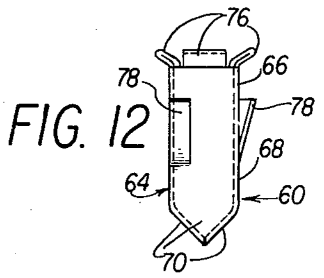
FIGURE 12 is an enlarged longitudinal elevational view of one of the terminal connectors of FIGURE 11 but showing the connector in a rotated position.

A more drastically modified embodiment of solder well terminal connector 60 according to the present invention is illustrated in connection with FIGURES 11–15. As before, the terminal connectors 60 are initially secured in chain form on a flexible metallic feed strip 62, as shown in FIGURE 11, for handling in automatic machinery.

The terminal connector 60 includes an elongated body portion 64 which is of substantially square cross-section. The body portion includes an upper fastening portion 66 and an integral lower solder well portion 68. The terminal connectors 60 are also intended to be inserted in the circular apertures 36 formed in the terminal base board 24 according to the previous embodiments. The body portion is sized so that the corners of its square cross-section will engage the sides of the hole 36. The bottom end of the solder well portion 68 is closed in a manner similar to the previous embodiments by means of four closing tabs 70, but the tabs are not overlapped as was the case with the earlier embodiments.

In order to resiliently grip or hold a plurality of leads 72 within the terminal connector 60, four holding or gripping fingers 74 are integrally formed within the connector. The gripping fingers 74 are of isosceles triangular configuration and extend in converging cantilever relation toward the closed end of the well as shown. As was the case with the previous embodiments, spring curls 76 connect the base portions of the gripping fingers 74 with the body portion 64 of the terminal connector, but in this embodiment the spring curls are formed at the top of the terminal connectors. The springs are curled outwardly to provide an intermittent bead similar to the earlier embodiments, and the bead engages the upper surface of the board 24. Thus, as in the other embodiments, the spring curls 76 also perform a stop function for locating the terminal connectors 60 in the apertures 36 in the terminal base board 24.

Figure 14:
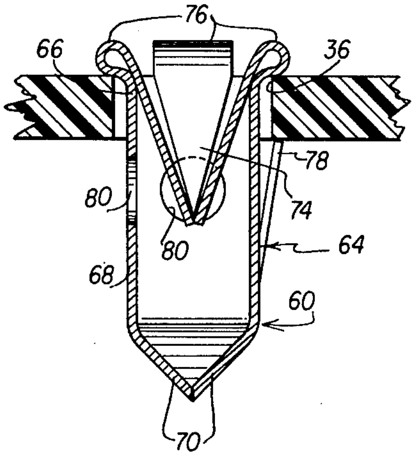
FIGURE 14 is a further enlarged sectional view taken along line 14—14 of FIGURE 13, but showing the terminal connector secured in a terminal base board.
Figure 15:
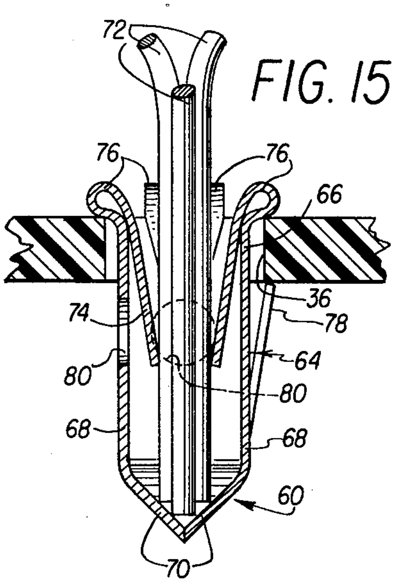
FIGURE 15 is a longitudinal sectional view similar to FIGURE 14 but showing the terminal connector with a plurality of wiring leads inserted therein before soldering.

To retain the solder well terminals 60 in the board apertures, a pair of resilient retaining lugs 78 are severed from the sides of the body portion 64 and extend outwardly and upwardly as shown. Because of the resilient nature of the retaining lugs 78, the solder well terminal connector of this embodiment may be snapped into the apertures 36 in the board 24. When the spring curls 76 engage the upper surface of the board, the retaining lugs 78 snap into place, as shown in FIGURES 14 and 15, to prevent removal of the terminal connector. The resilience of the spring curls 76 allows for limited variation in board thickness and, if desired, the spring curls may be formed outwardly and downwardly even further to provide for greater latitude in board thickness.

It will be understood that the gripping fingers 74 resiliently flexibly grip the leads 72 which are inserted into the terminal connectors, and substantial variation in wire size and in the number of wires inserted is permitted as was the case in the previous embodiments. Furthermore, the closed bottom end of the terminal connector provides a stop to eliminate any necessity for careful endwise locating of the wiring leads, and the leads do not extend all the way through the terminal connector, which would require an additional cut-off operation.

Free flow of solder into the solder well terminal connector is insured by formation of a pair of solder inlet apertures 80. The apertures 80 provide solder flow area in addition to the cut-outs from which the retaining lugs 78 were struck.

From the foregoing description it will be understood that the present invention provides improved terminal connectors for connecting electrical leads to a terminal base board. The terminal connectors are provided with resilient flexible lead-gripping fingers which permit ready insertion of leads but prevent inadvertent withdrawal. Because of the extreme flexibility of the gripping fingers, wide latitude is permitted in the number and sizes of leads which can be inserted into the terminals. The spring curls, which connect the gripping fingers with the terminal connectors proper, provide this extreme flexibility and at the same time act as stops for retaining the terminal connectors in the terminal base board. The closed ends of the terminals provide lead stops for proper lead placement and to eliminate the necessity for an additional cut-off operation. All embodiments of the terminal connector of this invention are constructed for foolproof handling by automatic machinery, and the various embodiments are inexpensive to manufacture.

Variations and modifications may be effected without departing from the scope of the novel concepts of the present invention.

We claim:

1. A terminal connector for securing one or more electrical leads to a terminal base board through the use of solder, comprising a hollow body secured to said base board and having a side closure wall and an opening for receiving said leads at one end of said body, a plurality of gripping fingers formed out of said wall to extend inwardly of said body in converging cantilever relation away from said opening and terminating in free ends immediately adjacent each other to grip the leads and to permit the free flow of molten solder into said hollow body, respective spring curls integrally and resiliently connecting said gripping fingers with said body and shortening said gripping fingers to prevent interference with said wall whereby leads inserted into the opening in said body are resiliently gripped by said fingers, and a closed end on said body opposite said opening sufficiently closely spaced to the free ends of said fingers to positively position the lead means by limiting the depth of penetration into said connector and to retain solder for forming a permanent solder connection.

2. A terminal connector for securing one or more electrical leads to a terminal base board having an aperture therein, comprising a hollow body disposed in the aperture in said base board, said body having a side closure wall and an opening at one end of said body for receiving said leads, a plurality of gripping fingers formed out of said wall to extend inwardly of said body in converging cantilever relation away from said opening, and respective spring curls integrally connecting said resilient fingers with said body, whereby leads inserted into the opening in said body are resiliently gripped by said fingers, said spring curls being adapted to engage said terminal base board to provide a stop for locating the terminal connectors in the aperture in said base board.

3. A terminal connector for securing one or more electrical leads to a terminal base board comprising a hollow closure body secured to said base board, a plurality of gripping fingers struck from the material of said body, said fingers each being integrally connected to said body and extending in converging relation toward one end of the body with the fingers normally ending closely adjacent one another, said fingers being generally triangular with the converging ends constituting apexes of the triangles and wherein triangular cut-outs are formed where the gripping fingers are struck from said body, spring curls integrally and resiliently connecting said gripping fingers with said body and serving to shorten said fingers with respect to said cut-outs to prevent interference between the fingers and the edges of the cut-outs during flexing of the fingers, and means closing said one end of said body, whereby leads inserted into the other end of said body are positioned against said closing means and are resiliently gripped by said fingers.

4. A terminal connector for securing one or more electrical leads to a terminal base board having an aperture therein, comprising a hollow closure body disposed in the aperture in said base board, said body having an opening for receiving said leads, a plurality of gripping fingers struck from said body and extending in converging cantilever relation away from said opening with the converging ends normally closely adjacent one another, said fingers leaving respective cut-outs in said body where struck therefrom, and respective spring curls integrally connecting the base ends of said fingers with said body, said spring curls being adapted to engage said terminal base board to provide a stop for locating the terminal in the aperture in said base board and said spring curls further serving to shorten said gripping fingers relative to said cut-outs to prevent interference between the fingers and the edges of said cut-outs when leads are inserted into the opening in said body for resilient gripping by said fingers.

5. A terminal connector for securing one or more electrical leads to a terminal base board comprising a hollow closure body secured to said base board and having an open end and a relatively closed end, said closed end being formed by two pairs of closing tabs with the tabs of the respective pairs being bent inwardly toward one another, the respective pairs of closing tabs having their free ends abutting one another with one pair of tabs overlying and abutting the other pair of tabs, a plurality of resilient gripping fingers stamped from said body and extending inwardly and with said body in converging cantilever relation away from said open end and toward said closed end with the converging ends of the fingers normally closely adjacent one another and spaced from the closed end of the body, and respective spring curls integrally and resiliently connecting said gripping fingers with said body, said spring curls thereby shortening said gripping fingers to prevent interference with said body, whereby leads inserted into the open end of said body are spaced against the tabs at said closed end and are resiliently gripped by said fingers.

6. A terminal connector for securing electrical lead means to a terminal base member through the use of solder, comprising a hollow body, said hollow body having a side closure wall and an opening for receiving said lead means at one end thereof, a plurality of gripping fingers formed out of said wall and extending inwardly of said body in converging cantilever relationship away from said opening, said fingers being resiliently connected with said body and terminating in free ends immediately adjacent each other to resiliently grip the lead means and to permit the free flow of molten solder into said hollow body, and a closed end on said body opposite said opening sufficiently closely spaced to the free ends of said fingers to positively position the lead means by limiting the depth of penetration into said connector and to retain solder for forming a permanent solder connection.

7. The terminal connector of claim 6 further characterized in that said connector is adapted to secure lead means including a plurality of leads of varying diameter, said immediately adjacent free ends of said fingers readily adapting themselves to retain various numbers of leads having various diameters.

8. The terminal connector of claim 6 further characterized in that said hollow body is adapted to be disposed in an aperture in the base member, and means formed on said body to provide a stop for locating said body in the base member aperture.

9. A terminal connector for utilizing solder for securing one or more electrical leads to a terminal base member having an aperture therein, comprising a hollow body adapted to be disposed in the base member aperture, said hollow body having a side closure wall and an opening for receiving the leads at one end thereof, a plurality of gripping fingers formed out of said wall to extend inwardly of said body in converging cantilever relationship away from said opening, means associated with said gripping fingers for preventing interference between said fingers and said wall, said fingers being resiliently connected with said body and having their free ends terminating immediately adjacent each other to resiliently grip the leads and to still permit the free flow of molten solder into said hollow body, and a closed end on said body opposite said opening, said closed end being sufficiently closely spaced to the free ends of said fingers to limit the depth of penetration into said connector by the one or more leads for positively positioning the leads and to retain solder for forming a permanent solder connection.

10. The terminal connector of claim 9 further characterized in that said means associated with said gripping fingers for preventing interference between said fingers and said wall also forms the resilient connection between said gripping fingers and said wall.

11. A terminal connector for securing electrical lead means to a terminal base member through the use of solder, comprising a hollow body, said hollow body having a side closure wall and an opening for receiving said lead means at one end thereof, a plurality of gripping fingers formed out of said wall and extending inwardly of said body in converging cantilever relationship away from said opening, said fingers being resiliently connected with said body and terminating in free ends immediately adjacent each other to resiliently grip the lead means, means in said wall to permit the free flow of molten solder into said hollow body, and a closed end on said body opposite said opening sufficiently closely spaced to the free ends of said fingers to positively position the lead means by limiting the depth of penetration into said connector and to retain solder for forming a permanent solder connection.

References Cited by the Examiner

UNITED STATES PATENTS

| | | | |
|---|---|---|---|
| 829,883 | 8/06 | Moody | 339—260 X |
| 1,331,928 | 2/20 | Katzung | 339—258 |
| 2,553,933 | 12/50 | Heath | 339—193 |
| 2,725,544 | 11/55 | Strange | 339—198 X |
| 2,745,081 | 5/56 | Offerman | 339—194 |
| 2,814,024 | 11/57 | Narozny | 339—220 X |
| 2,866,171 | 12/58 | Wagner et al. | 339—275 X |

FOREIGN PATENTS

| | | |
|---|---|---|
| 175,775 | 5/35 | Switzerland. |
| 437,546 | 10/35 | Great Britain. |
| 520,105 | 4/40 | Great Britain. |
| 553,280 | 5/43 | Great Britain. |
| 584,629 | 1/47 | Great Britain. |
| 659,447 | 10/51 | Great Britain. |
| 755,651 | 8/56 | Great Britain. |

M. HENSON WOOD, JR., *Primary Examiner.*

JOSEPH D. SEERS, *Examiner.*